United States Patent
Jordil et al.

(10) Patent No.: US 7,043,846 B2
(45) Date of Patent: May 16, 2006

(54) REFERENCE GAUGE FOR CALIBRATING A MEASURING MACHINE AND METHOD FOR CALIBRATING A MEASURING MACHINE

(75) Inventors: Pascal Jordil, Ecoteaux (CH); Charles-Henri Zufferey, Erde (CH); Adriano Zanier, Prilly (CH)

(73) Assignee: Tesa SA, Renens (CH)

( * ) Notice: Subject to any disclaimer, the term of this patent is extended or adjusted under 35 U.S.C. 154(b) by 0 days.

(21) Appl. No.: 10/314,832

(22) Filed: Dec. 9, 2002

(65) Prior Publication Data

US 2003/0106229 A1    Jun. 12, 2003

(30) Foreign Application Priority Data

Dec. 12, 2001   (EP) .................................. 01811220

(51) Int. Cl.
*G01B 3/30*   (2006.01)
*G01B 3/32*   (2006.01)

(52) U.S. Cl. .......................................... 33/502; 33/567
(58) Field of Classification Search ................. 33/502, 33/567, 501.45, 501.05, 501.08
See application file for complete search history.

(56) References Cited

U.S. PATENT DOCUMENTS

| | | | | |
|---|---|---|---|---|
| 2,636,279 A | * | 4/1953 | Tornehohm | .................. 33/567 |
| 2,831,256 A | * | 4/1958 | Werle | ........................... 33/567 |
| 2,840,916 A | * | 7/1958 | Mueller | ........................ 33/701 |
| 3,162,955 A | * | 12/1964 | Egli | ............................. 33/567 |
| 3,276,132 A | * | 10/1966 | Egli | ............................. 33/567 |
| 4,445,276 A | * | 5/1984 | Voneky et al. | ................. 33/567 |
| 4,899,094 A | | 2/1990 | Pilborough | |
| 4,962,591 A | * | 10/1990 | Zeller et al. | .................. 33/502 |
| 5,134,781 A | | 8/1992 | Baker | |
| 5,231,768 A | * | 8/1993 | Beckwith, Jr. | ............... 33/567 |
| 6,062,062 A | * | 5/2000 | Toida et al. | .................. 73/1.81 |
| 6,434,845 B1 | * | 8/2002 | Pereira et al. | ................ 33/502 |
| 6,493,956 B1 | * | 12/2002 | Matsuda | ....................... 33/502 |

FOREIGN PATENT DOCUMENTS

| | | |
|---|---|---|
| GB | 595190 | 11/1947 |
| JP | 2000039304 | 2/2000 |
| JP | 2003194501 A * | 7/2003 |

* cited by examiner

*Primary Examiner*—R. Alexander Smith
(74) *Attorney, Agent, or Firm*—Pearne & Gordon LLP

(57) ABSTRACT

Reference gauge for calibrating measuring machines whose reference dimension can be measured both on its inner size and by its outer size, thus making it possible to keep the reference dimension less than 15 millimeters, even for calibrating measuring machines equipped with probe tips having a diameter greater than that dimension. The calibration method with the aid of such a reference gauge comprises in certain cases the measuring of the calibrated distance between two outer surfaces of a protruding volume.

2 Claims, 1 Drawing Sheet

REFERENCE GAUGE FOR CALIBRATING A MEASURING MACHINE AND METHOD FOR CALIBRATING A MEASURING MACHINE

This application claims priority of European Patent Application EP 01811220.1, the content of which is hereby incorporated.

FIELD OF THE INVENTION

The present invention concerns a reference gauge for calibrating a measuring machine. The present invention also concerns the calibrating method associated with a reference gauge according to the invention.

RELATED ART

Measuring machines have a mobile arm that can be moved in one or several directions and whose position is determined accurately by means of measuring systems that can be for example capacitive, inductive, magneto-resistive or opto-electronic. At the end of the mobile arm, a generally spherical probe tip is mounted. The arm of the measuring machine is displaced in space along a determined trajectory until a certain measuring point, for example a surface, an edge or a precise point of a measuring piece. The coordinates of this point are recorded, either manually by the operator, or for example by a software attached to the measuring machine. Such a software then allows to calculate for example the height of the measuring point relative to the work surface or to any other reference plane, to calculate the dimensions of an object, or, in certain cases, to represent an object to be measured in two or three dimensions by means of a series of measuring points.

In order to guarantee the measuring accuracy, the measuring machine must be calibrated regularly to correct possible errors caused for example by the variation in environmental conditions, by the change of the probe tip's diameter, etc. The calibration is performed at least each time it is put into operation again and before being able to perform measurements.

The tool commonly used for calibrating a measuring machine is a reference gauge. The reference gauge generally has a calibrated fork that serves to calibrate the measuring machine along a certain axis. The fork is placed around the probe tip. The arm of the measuring machine is moved along a determined axis until the probe tip comes into contact with a first surface of the fork, thus determining a first measuring point. The arm of the measuring machine is then moved in the opposite direction until it touches the other surface of the fork, thus determining a second measuring point. As the measuring machine's software knows the exact dimensions of the calibrated fork, its movement and in certain cases the exact dimensions of the probe tip, it can then calculate the calibrating parameters, such as for example the deflections and the hystereses existing in such a mechanical system during a change of direction. The calibrating process must be repeated after each time it is put into operation again and before being able to perform measurements.

In order to improve the quality of the measurement of the calibrated fork's dimensions, it is favorable to limit the dimensions of the fork itself. Such a diminution having the disadvantage that it prevents using probe tips that have a diameter more or less equal to or greater than the calibrated fork's dimensions. The fork's dimensions is thus the result of a trade-off between the sought precision of the measuring and the possibility of using the reference gauge with a maximum choice of usual probe tips. Thus, the gauges currently used all have a reference dimension of either 20 millimeters, or of 25.4 millimeters (1 inch) according to the adopted measuring system.

It is an aim of the present invention to propose a reference gauge allowing a more accurate calibration than the current gauges whatever the diameter of the probe tip of the measuring machine.

BRIEF SUMMARY OF THE INVENTION

According to the invention, this aim is achieved by means of a reference gauge whose reference dimension can be measured both by its inner size and by its outer size. The measuring of the reference dimension can be performed either, as previously described, by measuring the linear displacement of the measuring machine's arm between two reference surfaces demarcating a calibrated fork, or by measuring the distance between a first measuring point on the side of a gauge block and a second measuring point on the opposite side of the same gauge block. The dimension chosen for the reference dimension should be less than 20 millimeters, advantageously less than 15 millimeters and preferably less than 7 millimeters.

A reference gauge according to the invention has two major advantages:
1. the reference dimension is greatly diminished relative to that of current gauges, thus limiting the displacement of the measuring machine's arm during calibration;
2. the reference dimension can be measured either on the inner size of a calibrated fork or on the outer size of a protruding volume, so that the same reference gauge can be used for calibrating measuring machines using probe tips of any diameter.

DESCRIPTION OF THE DRAWINGS

The invention will be better understood by reading the description of a preferred embodiment given by way of example and illustrated by the attached drawings, in which.

DETAILED DESCRIPTION OF THE INVENTION

Figure 2:
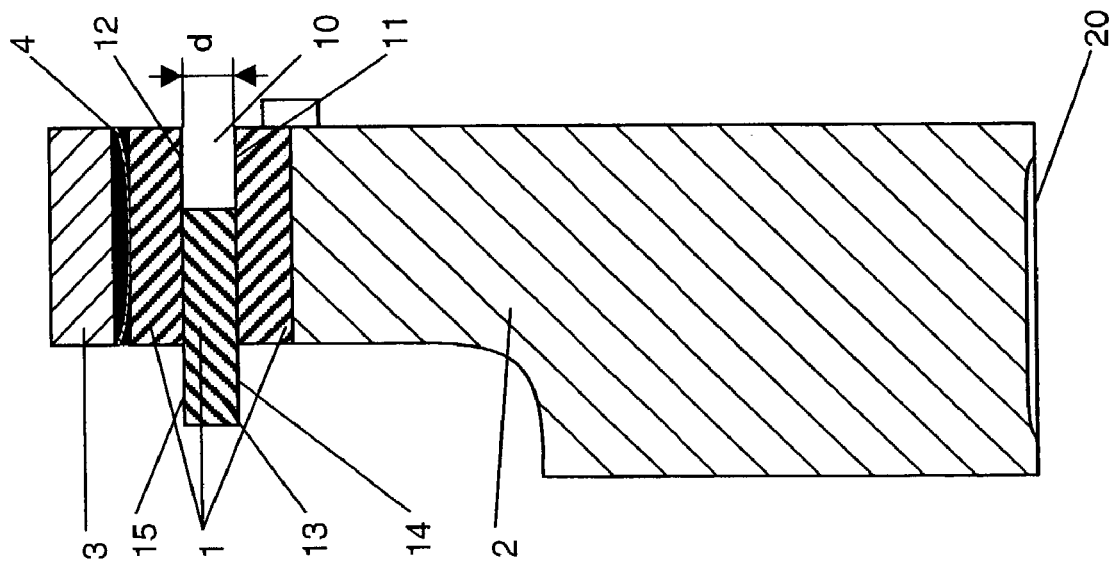
FIG. 2 shows a cross section of the gauge represented in FIG. 1.
Figure 1:
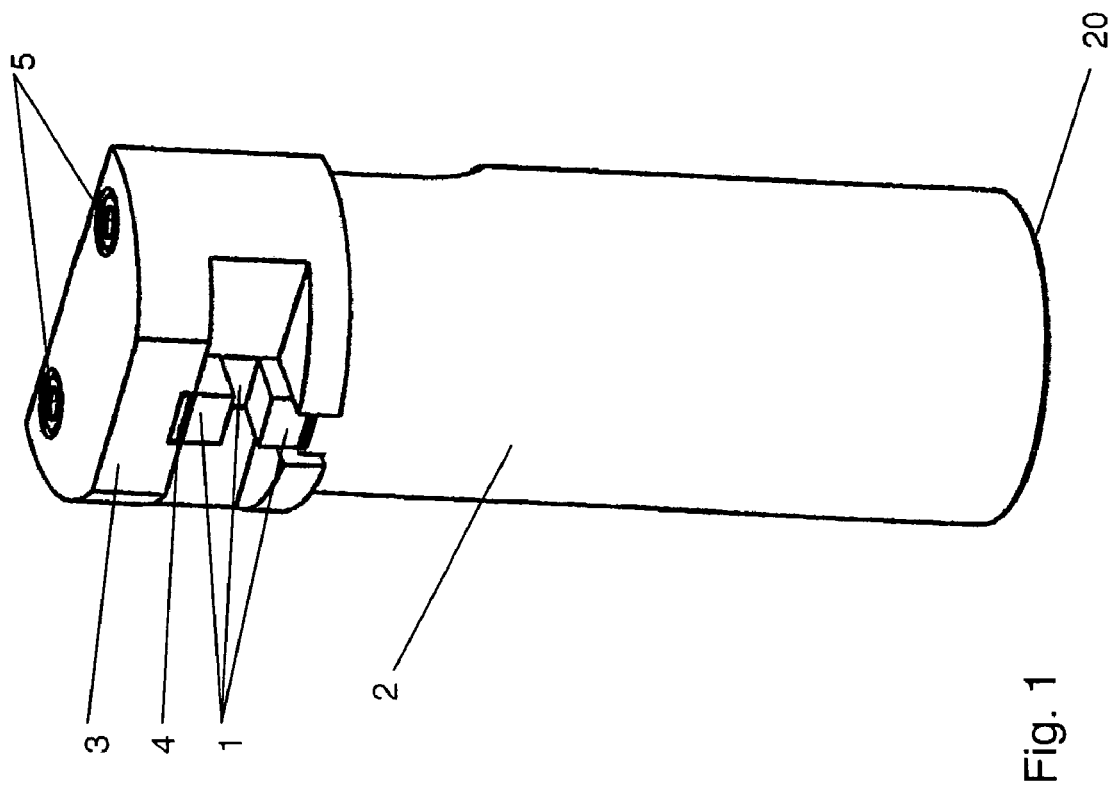
FIG. 1 shows a perspective view of a reference gauge according to the invention, adapted to the calibration of height-measuring columns.

The preferred embodiment of the reference gauge according to the invention is a reference gauge designed for calibrating a height-measuring column. A height-measuring column is a measuring machine measuring distances only along the vertical axis. The height-measuring column is generally placed on a perfectly even work surface, thus allowing an accurate measuring of either the vertical distance between two measuring points or of the height of a measuring point relative to this work surface. The reference dimension of the reference gauge designed for calibrating a height-measuring column is therefore oriented in a vertical plane relative to the work surface.

The main elements constituting a reference gauge according to the preferred embodiment of the invention are three gauge blocks 1, a base 2 and a covering cap 3.

The gauge blocks 1 are mechanical pieces that are preferably parallelepipedic, worked in a hard material that is not sensitive to environmental variations, having at least one dimension determined with the greatest precision by a very accurate working of two of its opposed surfaces. In a preferred embodiment of the invention, for reasons of simplification and cost-reduction, the three gauge blocks 1 are identical. The chosen reference dimension d is equal to 6.35 millimeters (¼ inch), this dimension being adapted to calculations both in the metric as well as in the imperial system. The calibrated fork 10 is constituted by the superposition of the three gauge blocks 1, the middle one being significantly shifted relative to the other two. In this manner, the assembly of the three gauge blocks 1 has, opposite the calibrated fork 10, a protruding part 13 of the middle gauge block, designed for calibrating measuring machines using a probe tip having a diameter too great for it to be inserted in the calibrated fork 10.

The base 2 has a seat 20 through which the reference gauge is in contact with the work surface. The base 2 gives the gauge its stability. It is heavy and of large size relative to the reference dimension d. The base 2 determines the distance between the calibrated fork 10 or the protruding volume 13 and the work surface, and this distance must be sufficiently great to allow the measuring column's arm to measure the calibrated fork without having reached the end of its vertical course. Preferably, the base's height will be between 5% and 20% of the height-measuring column's height. The base's seat also determines the orientation of the calibrated fork 10 and of the protruding volume 13 relative to the work surface.

The covering cap 3 holds the gauge blocks on the base whilst freeing a surface sufficiently large around the calibrated fork 10 and of the calibrated volume 13 to allow the probe tip to access it easily during calibration. The covering cap 3 is screwed onto the base by means of two screws 5, and a spring 4 inserted between the covering cap and the gauge blocks 1 ensures a constant pressure on the gauge blocks 1 in order to prevent any misadjustment of the reference gauge.

The preferred embodiment of the reference gauge according to the invention makes use of three superposed gauge blocks 1, the middle one being shifted relative to the others in order to form the calibrated fork 10 and to have part of the middle gauge block 13 protrude. It is also possible in a variant embodiment (not represented) to replace the upper and lower gauge blocks, for example, through mechanical pieces having only one perfectly even surface. The perfectly plane surface of each of these pieces is in contact with the middle gauge block, thus forming a calibrated fork whose surfaces are perfectly even. The dimensions of these pieces must however allow part of the gauge block to remain salient relative thereto. It is also possible to manufacture with the greatest precision either the upper surface of the base, or the lower surface of the covering cap, or both, so that one or both of these surfaces serve as surface demarcating one side of the calibrated fork.

Use of the reference gauge according to the preferred embodiment of the invention has been illustrated here above by way of example by the calibration of a height-measuring column. The one skilled in the art will however easily understand that such a gauge can also be used for calibrating along a vertical axis any two-dimensional or three-dimensional measuring machine.

In a second embodiment (not represented) of the reference gauge according to the invention, the reference dimension, realized as in the preferred embodiment by a calibrated fork and by a protruding volume, is oriented in a horizontal plane, thus allowing a one-, two- or three-dimensional measuring machine to be calibrated along any axis situated in a horizontal plane.

In a third embodiment, the reference gauge has at least two calibration dimensions represented each both by the calibrated fork and by a protruding volume, one of the at least two calibrated dimensions being oriented in a vertical plane, another of the at least two calibrated dimensions being oriented in a horizontal plane, thus allowing the same reference gauge to be used for calibrating a two- or three-dimensional machine along the vertical axis and along at least one horizontal axis.

There are two variants for the method for calibrating a measuring machine associated with the use of a reference gauge according to the invention.

In the case where the diameter of the measuring machine's probe tip is considerably less than the calibrated dimension d, the two surfaces 11 and 12 demarcating the calibrated fork are positioned on either side of the probe tip along the axis in which the measuring machine is to be calibrated. The measuring machine's arm is then displaced along this axis until the probe tip comes into contact with a first surface 11 or 12, thus determining a first measuring point. The measuring machine's arm is then displaced in the opposite direction along the same axis until it comes into contact with the other surface 12 or 11 demarcating the calibrated fork, thus determining the second measuring point. The calibrating parameters are then calculated by means of the known calibrated dimension d, of the measurement of the displacement of the measuring machine's arm and, if it is known precisely, of the probe tip's diameter.

In the case where the diameter of the measuring machine's probe tip is more or less equal to or greater than the calibrated dimension d, the protruding volume is placed close to the probe tip in a position that is precisely determined, its surfaces 14 or 15 being oriented in a plane perpendicular to the axis in which the measuring machine must be calibrated. The measuring machine's arm is then displaced along this axis, until the probe tip comes into contact with a first surface 14 or 15, thus determining a first measuring point. The measuring machine's arm is then moved slightly in the opposite direction in order to allow the reference gauge to withdraw, then again in the initial direction by a distance considerably greater than d. The gauge is replaced precisely in its initial position. The measuring machine's arm is then displaced in the opposite direction along the same axis until it comes into contact with the other surface 15 or 14 demarcating the protruding volume, thus determining the second measuring point. The calibrating parameters are then calculated by means of the known calibrated dimension d, of the distance measured between the two measuring points and, if it is known precisely, of the probe tip's diameter.

The invention claimed is:

1. A method for calibrating a measuring machine having a feeler probe, comprising the steps of:
   providing, in the reference frame of the measuring machine, a reference gauge comprising a first, middle and third gauge blocks, wherein the middle gauge block is placed between the first gauge block and the third gauge block, a thickness of the middle gauge block corresponding to a reference dimension (d) of the reference gauge, the first and third gauge block defining a calibrated fork, the middle gauge block protruding from the first and third gauge blocks;
   measuring the reference dimension of the reference gauge by bringing the feeler probe in contact with a first face of the first gauge block and with a second face of the third gauge block, juxtaposed to the first face, when the dimension of the feeler probe does not exceed the reference dimension of the reference gauge;

measuring the reference dimension of the reference gauge by bringing the feeler probe in contact with two opposed faces of the middle gauge block, when the dimension of the feeler probe exceeds the reference dimension of the reference gauge.

2. A reference gauge having at least one reference dimension (d) for calibration in a given reference frame of a measuring machine, comprising a first, middle and third gauge blocks, wherein said middle gauge block is placed between said first gauge block and said third gauge block, wherein said at least one reference dimension can be measured in a first manner by measuring the distance between a first face of said first gauge block and a second face of said third gauge block, juxtaposed to said first face, and said first face and said second face defining a calibrated fork, and wherein said at least one reference dimension can be measured in a second manner by measuring the distance between the two opposed faces of said middle gauge block, and wherein said first, middle and third gauge blocks are held in reciprocal contact by means of a spring ensuring a constant pressure on said first, middle and third gauge blocks.

* * * * *